United States Patent [19]

Mayrand et al.

[11] Patent Number: 5,504,939
[45] Date of Patent: Apr. 2, 1996

[54] COMMUNICATION CHANNEL SELECTION IN CELLULAR RADIO COMMUNICATION SYSTEMS

[75] Inventors: Luc Mayrand, Quebec, Canada; Håkan E. Olov, Vallentuna; Håkan A. Claes, Ekerö, both of Sweden

[73] Assignee: Telefonaktiebolaget L M Ericsson, Stockholm, Sweden

[21] Appl. No.: 147,333

[22] Filed: Nov. 3, 1993

Related U.S. Application Data

[63] Continuation-in-part of Ser. No. 956,093, Oct. 2, 1992, abandoned.

[51] Int. Cl.⁶ ..................................................... H04Q 7/38
[52] U.S. Cl. ..................... 455/34.1; 455/33.1; 455/34.2; 455/54.2
[58] Field of Search ................................. 455/33.1, 34.1, 455/34.2, 54.1, 54.2, 62, 33.2, 49.1, 88; 379/59, 60, 63

[56] References Cited

U.S. PATENT DOCUMENTS

| | | | |
|---|---|---|---|
| 4,633,509 | 12/1986 | Scheinert | 455/33 |
| 4,768,220 | 8/1988 | Yoshihara | 379/63 |
| 4,783,780 | 11/1988 | Alexis | 370/95 |
| 4,887,265 | 12/1989 | Felix | 455/34.1 |
| 4,914,651 | 4/1990 | Lusignan | 370/69.1 |
| 5,025,254 | 6/1991 | Hess | 455/34.1 |
| 5,081,671 | 1/1992 | Raith | 379/60 |

FOREIGN PATENT DOCUMENTS

| | | |
|---|---|---|
| 2244627 | 12/1991 | United Kingdom . |
| 2253323 | 9/1992 | United Kingdom . |

*Primary Examiner*—Reinhard J. Eisenzopf
*Assistant Examiner*—Nguyen Vo
*Attorney, Agent, or Firm*—Jenkens & Gilchrist

[57] ABSTRACT

A system for allocating communication channels within a cellular radio system in which each channel seizure request is assigned a call type based upon the capabilities of the mobile station, the nature of the call and the characteristics of the subscriber. A first algorithm is used to select a communication channel group for the call and a second algorithm is used to select an available communication channel from within the selected channel group.

28 Claims, 4 Drawing Sheets

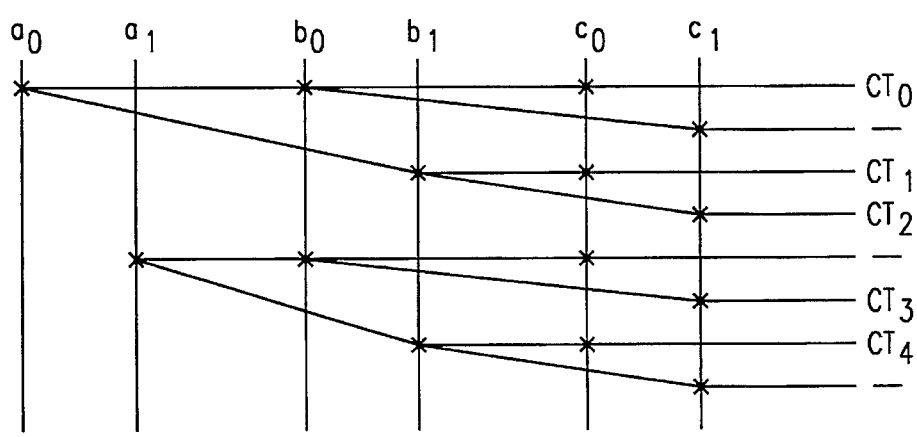
FIG. 2
(PRIOR ART)
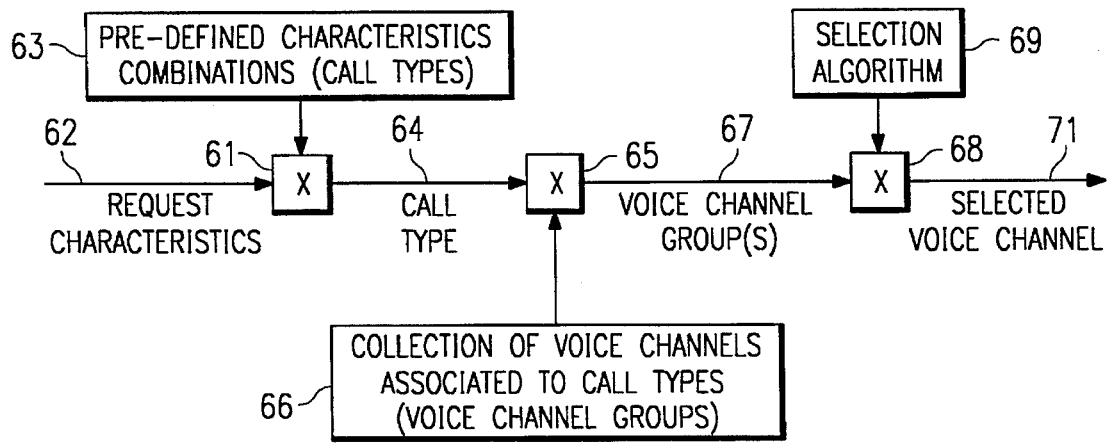
FIG. 4
FIG. 7

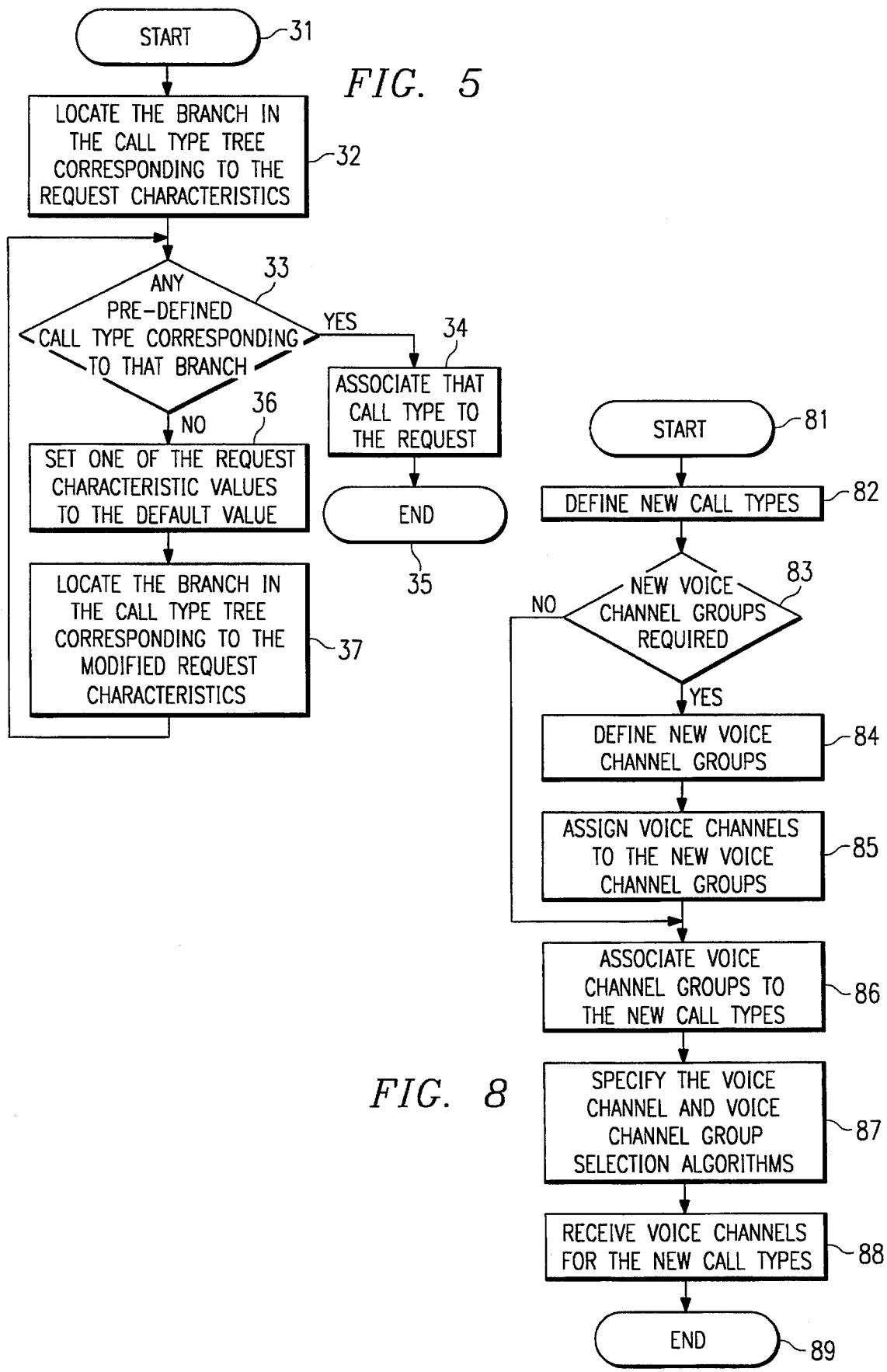

COMMUNICATION CHANNEL SELECTION IN CELLULAR RADIO COMMUNICATION SYSTEMS

This application is a continuation-in-part application of U.S. Ser. No. 07/956,093 filed Oct. 2, 1992.

BACKGROUND OF THE INVENTION

1. Field of the Invention

The invention relates to cellular radio communication systems and, more particularly, to the assignment of radio communication channels in such systems.

2. History of the Prior Art

When cellular radio systems were first implemented, specific frequencies within a basic frequency range were assigned for communication between fixed radio base stations and mobile subscribers using analog modulation techniques. Correspondingly, the mobile radio transceivers available to mobile subscribers at that time were capable of transmitting and receiving radio signals only on the assigned radio frequencies within the basic frequency range and could communicate only with analog modulation techniques.

As the use of cellular radio systems increased over the years, the limited number of basic frequencies assigned by the communications authorities for cellular usage became increasingly congested this led to the frequent occurrence of call blockages due to the unavailability of a communication channel frequency for use by a calling or called subscriber. To decrease the level of congestion in cellular radio systems, an additional frequency range, referred to as the extended frequencies, was assigned for use by cellular radio systems. This addition made available an increased number of communication channels in each system, the added frequency channels all lying in the extended frequency band, to accommodate a greater amount of traffic and an increased number of subscribers. However, new mobile transceivers needed to be designed and manufactured which would communicate not only on radio channels within the "basic frequency" range, but also on radio channels within the "extended frequency" range. At this time all communications in both frequency ranges took place using analog modulation. However, since there would then be mobile transceivers operating within the system which were capable of operating in both the basic and extended frequency ranges, as well as mobile transceivers which could only operate within the basic frequency range, it became necessary to have each mobile station identify to the system its frequency capabilities upon seeking access to a communication channel so that a channel assignment could then be made in accordance with the specific frequency capabilities of the requesting mobile transceiver.

When digital modulation techniques began to be used on the radio communication channels available between a base station and a mobile, newer subscriber units were provided with transceivers of the so-called "dual mode" type. Such mobile transceivers are capable of operating with both analog modulation techniques as well as digital modulation techniques within both the basic and extended frequency ranges. This additional capability added another parameter which must be indicated to the system by the mobile when seeking access to a communication channel and which must be evaluated by the system when assigning a communication channel to a mobile seeking access.

In conventional cellular radio telecommunication systems, the decision-making algorithms necessary for the system to assign available communication channels to a mobile as a function of its frequency/modulation capabilities were hard coded into the software of the cellular switch. While these techniques adequately solved the problem at issue by ensuring that each mobile station is only assigned a communication channel according to its particular frequencys and modulation capabilities, they did not allow flexibility in communication channel assignments to be incorporated into the system through taking into consideration parameters other than frequency and modulation. For example, there was no way to allocate communication channels as a function of the priority of service accorded to a particular mobile subscriber or to assign a particular communication channel depending upon the service features to be provided to the subscriber during the connection.

It would be a distinct advantage to enable an operator of a cellular radio system to custom configure the parameters to be employed by the system in allocating communication channel assignments in order to optimize the service provided to a subscriber within the system. It would also be desirable to provide unique call handling priorities within the system as a function of the classes of service subscribed to by individual subscribers.

SUMMARY OF THE INVENTION

In one aspect, the present invention includes allocating communication channels within a cellular telecommunications system by assigning a call type to each communication channel request received by the system. The communication channels available within a cell of the system are arranged in preselected communication channel groups with each being associated with one or more specified call types. Each communication channel request is assigned to a communication channel group based upon the call type determination thereof. A communication channel is then selected from the assigned communication channel group associated with that call type and the call associated with the communication channel request is assigned to the selected communication channel.

In a further aspect of the invention, communication channels are selected within a cellular telecommunications system by pre-defining certain characteristic combinations as pre-defined call types. The pre-defined characteristics are compared to the characteristics of the communication channel request and the call type which is associated with the predefined combination closest to the characteristics of the request is accepted as the call type of the communication channel request.

In a still further aspect of the invention, a communication channel is selected within a cellular telecommunications system in which one or more characteristics are defined by one or more values and at least one of each of the values is selected as a default value. In addition, the characteristics of the communication channel request are compared to the characteristic combinations associated with each of the pre-defined call types and ones of the characteristics of the communication channel request are sequentially modified by resetting one of its defining values to the default value thereof in response to a failure to obtain an exact match during the comparison. The modified characteristics of the communication channel request are successively recompared, using each of the successively modified values, to the characteristic combination associated with each pre-defined call type. The call type which is associated with the first pre-defined combination which matches the modified characteristics of the request is accepted as the call type of the communication channel request.

In yet another aspect, the system of the present invention includes means for determining the call type associated with a particular communication channel seizure request coming into the system. The call type determination is based upon the capabilities of the mobile stations, the characteristics of the calls and the characteristics of the subscribers. Means are provided to associate a list of communication channel groups with a given call type on a cell by cell basis. The call type is used to determine the communication channel group from which the communication channel is selected for assignment to the call.

BRIEF DESCRIPTION OF THE DRAWINGS

For a more detailed understanding of the present invention, and for further objects and advantages thereof, reference can now be had to the following description, taken in conjunction with accompanying drawings, in which:

FIG. 2 is a chart illustrating the prior art technique of assigning communication channels;

FIG. 4 is a chart illustrating an exemplary call types tree employed in the present invention;

FIG. 5 is a flow chart illustrating a method of call type determination included in the present invention;

FIG. 7 is a block diagram illustrating a further aspect of communication channel assignment in accordance with the present invention; and FIG. 8 is a flow chart illustrating a method of defining parameters associated with communication channel assignment in accordance with the present invention.

DETAILED DESCRIPTION

Figure 1:
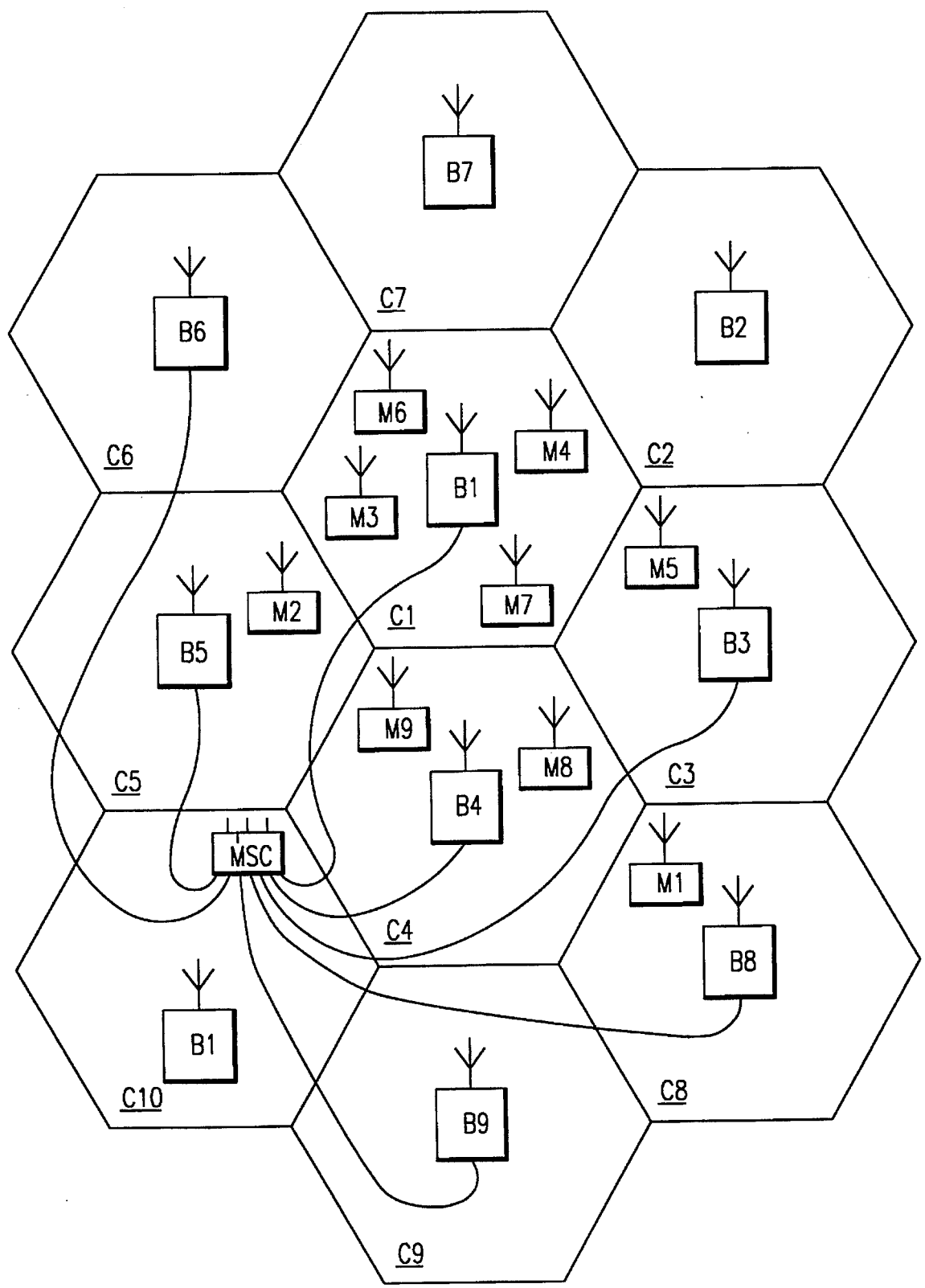
FIG. 1 is a block diagram illustrating a cellular radio communication system within which the present invention is implemented.

Referring first to FIG. 1, there is illustrated a conventional cellular radio communication system of the type to which the present invention generally pertains. In FIG. 1, an arbitrary geographic area may be divided into a plurality of contiguous radio coverage areas, or cells C1–C10. While the system of FIG. 1 is illustratively shown to include only 10 cells, it should be clearly understood that, in practice, the number of cells will be much larger.

Associated with and located within each of the cells C1–C10 is a base station designated as a corresponding one of a plurality of base stations B1–B10. Each of the base stations B1–B10 includes a transmitter, a receiver, and a base station controller as are well known in the art. In FIG. 1, the base stations B1–B10 are illustratively located at the center of each of the cells C1–C10, respectively, and are equipped with omni-directional antennas. However, in other configurations of the cellular radio system, the base stations B1–B10 may be located near the periphery, or otherwise away from the center of the cells C1–C10 and may illuminate the cells C1–C10 with radio signals either omni-directionally or directionally. Therefore, the representation of the cellular radio system of FIG. 1 is for purpose of illustration only and is not intended as a limitation on the possible implementations of the cellular radio system within which the present invention is implemented.

The cellular radio system of FIG. 1 may also include as one alternative embodiment a base station controller which supports several base stations, as for example in the case of the digital radio system currently being implemented in the European countries in accordance with the so-called GSM Standards. In such a cellular radio system one or more mobile switching centers (MSC) can each serve a group of base station controllers.

With continuing reference to FIG. 1, a plurality of mobile stations M1–M10 may be found within the cells C1–C10. Again, only 10 mobile stations are shown in FIG. 1 but it should be understood that the actual number of mobile stations will be much larger in practice and will generally greatly exceed the number of base stations. Moreover, while none of the mobile stations M1–M10 may be found in some of the cells C1–C10, the presence or absence of the mobile stations M1–M10 in any particular one of the cells C1–C10 should be understood to depend in practice on the individual desires of the mobile subscriber using the mobile stations M1–M10 who may roam from one location in the cell to another or from one cell to an adjacent cell or neighboring cell, and even from one cellular radio system served by an MSC to another such system.

Each of the mobile stations M1–M10 is capable of initiating or receiving a telephone call through one or more of the base stations B1–B10 and a mobile switching center MSC. The mobile switching center MSC is connected by communication links, e.g., cables, to each of the illustrative base stations B1–B10 and to the fixed public switched telephone network PSTN, not shown, or a similar fixed network which may include an integrated services digital network (ISDN) facility. The relevant connections between the mobile switching center MSC and the base stations B1–B10, or between the mobile switching center MSC and the PSTN or ISDN, are not completely shown in FIG. 1 but are well known to those of ordinary skill in the art. Similarly, it is also known to include more than one mobile switching center in a cellular radio system and to connect each additional mobile switching center to a different group of base stations and to other mobile switching centers via cable or radio links.

The MSC controls the administration of communication between each of the base stations B1–B10 and the mobiles M1–M10. For example, the MSC will control the paging of a mobile station believed to be in the geographic area served by its base stations B1–B10 in response to the receipt of a call for that mobile, the assignment of radio channels to a mobile station by a base station upon receipt of page response from the mobile station, as well as the handoff of communications with a mobile station from one base station to another in response to the mobile traveling through the system, from cell to cell, while communication is in progress.

Each of the cells C1–C10 is allocated a plurality of communication or speech channels and at least one access or control channel, such as a forward control channel (FOCC). The control channel is used to control or supervise the operation of mobile stations by means of information transmitted to and received from those units. Such information may include incoming call signals, outgoing call signals, page signals, page response signals, location registration signals, communication channel assignments, maintenance instructions, and "handoff" instructions as a mobile station travels out of the radio coverage of one cell and into the radio coverage of another cell. The control and communication channels may operate either in an analog or a digital modulation mode or a combination thereof, as well as at a broadcast frequency within the basic range of frequencies or within the extended range of frequencies or a combination thereof.

As discussed above, radio communication channels between base stations and mobile stations may lie within one of multiple frequency ranges, for example a basic frequency and an extended frequency band, and may employ one of multiple modulation techniques, for example either analog or digital. Individual mobile radio transceivers may be capable of operating on only one frequency band and modulation technique or on all bands and modulation techniques, depending on the date the transceiver was manufactured and other factors. For this reason, a cellular system is required to identify the type of mobile station requesting a communication channel assignment and assign a channel in accordance with the capabilities of the particular mobile station to ensure that communication with the station can occur on the assigned channel. In order to accomplish this end, prior art systems employ a communication channel assignment scheme of the type indicated in the chart of FIG. 2. There it can be seen in the left hand column 11 that the system must first determine the modulation capabilites of the mobile station, either analog or dual mode (both analog and digital), as well as its frequency capabilities, either basic or extended (both basic and additional frequencies). Once the characteristics of the mobile station requesting a communication channel assignment are determined, such an assignment is made based upon the priority of available types of channels as set forth in columns 12–14 of FIG. 2. For example, the first (and only) choice for a mobile station capable of analog modulation within only the basic frequency group is that of assignment to an analog communication channel having a frequency within the basic frequency range. There are no other second and third choices for a mobile station with these characteristics in its request. However, a mobile station capable of analog modulation within the extended frequency range is assigned a communication channel based upon the first choice of an analog channel within the extended range and a second choice of analog modulation within the basic frequency range. Similarly, a dual mode mobile station was assigned a communication channel based upon a first choice of a digital channel, a second choice of an analog extended channel and a third choice of an analog channel within the basic frequency range. This communication channel assignment scheme is conventionally hard coded into the software of the MSC controlling the base station assigning the communication channel and functionally accomplishes the goal of ensuring that mobile stations are only assigned to communication channels which require performance characteristics possessed by that particular mobile station. This technique of communication channel assignment as shown in FIG. 2 does not allow the system operator the flexibility of either changing the communication channel assignment algorithm or introducing the consideration of additional characteristics or parameters into the communication channel assignment determination.

The system of the present invention introduces an enhanced level of flexibility within communication channel assignment procedures by enabling the operator of the system to assign different levels of priority to communication channel selection based upon a number of different selectable criteria. For example, the present system incorporates the seizure of appropriate communication channels within a system based upon the capabilities of the mobile stations for which those channels are selected, the characteristics of the calls themselves for which the channels are being requested, and the characteristics of the subscribers, i.e., based upon both the nature of the subscriber equipment as well as the classes of service to which that subscriber has subscribed. Implementation of the present system involves a process of matching a request for a communication channel to a predefined call type and then selecting a communication channel from among the communication channel groups that are specified for the call type. The call types and the communication channel groups may be flexibly defined by the operator of the system depending upon the characteristics of the system itself. The system of the present invention provides for association of a list of communication channel groups to a given call type on a cell by cell basis. Communication channels can also be associated into communication channel groups on a cell by cell basis and an idle list is maintained for each communication channel group in each cell.

Figure 3:
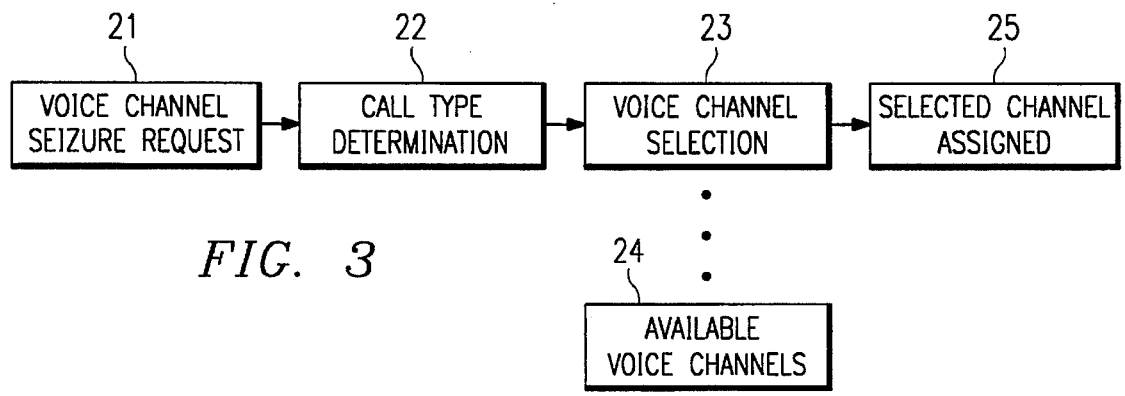
FIG. 3 is a block diagram illustrating one aspect of communication channel assignment in accordance with the present invention.

Referring next to FIG. 3, there is shown a block diagram illustrating a system for communication channel assignment constructed in accordance with the present invention in which communication channel seizure requests are processed by the system following internal generation thereof by an MSC during its handling of traffic with a mobile station, e.g., call to, call from, handoff, etc. The receipt of a communication channel seizure request at 21 is followed by a call type determination at 22 and then, based upon that determination, communication channel selection at 23 of a suitable communication channel from the available pool of communication channels 24. The selected channel is assigned at 25 and the call is set up for communication. When the communication channel handling procedure is requested to seize a communication channel in a given cell at 21, it begins this process by comparing the characteristics of the request received to the characteristics of a pre-defined set of call types. Each call type within the set is a unique combination of mobile station, subscriber and call characteristics. For example, the mobile station characteristics could consist of speech modulation capabilities, i.e., analog only or dual mode; frequency band capabilities, i.e., basic frequencies or extended frequencies, and power classes of operation, i.e., 1 to 8 indicative of the type of station such as mobile, transportable, or portable. The subscriber characteristics employed could for example, be the mobile subscriber categories that are needed for communication channel selection such as any one or more of the classes of service available to a subscriber in the system. Such mobile subscriber classes of service could include, for example, priority service, data service, call forwarding, and many others depending upon the service features offered by the particular system. Moreover, mobile service features may include all those defined by the various revisions of the standards specifications of C.C.I.T.T., ANSI or any other standard setting body, including: transfer on no answer, transfer on busy, three way calling, call waiting, forwarding of incoming calls, forwarding of outgoing calls, immediate service, malicious call tracing, voice privacy, message privacy, message waiting, priority access and channel assignment, extension phone service, selective call acceptance and networked voice mail handling. Finally, call characteristics could be those which relate to the call itself such as call access, e.g., originating, terminating, non-traffic, etc., and the seizure event, e.g., access, handoff, intra-cell handoff, etc. Based upon the result of the comparison of the call with the various pre-defined set of call types, a call type which best represents the complete characteristics of the communication channel seizure request is selected by the system at 22.

In some cellular radio systems, as for example in the systems conforming to the GSM digital radio standards, there will in the near future be a mixture of mobile stations having different capabilities, some of them having only fullrate speech coders and some of them having both fullrate and halfrate speech coders. It is likely that there will be a difference in quality requirements on the communication channels to support mobile stations with halfrate coders compared to mobile stations with fullrate coders. In the GSM-system a mobile station utilizing a fullrate speech coder uses a bitrate of 13 kbit/s while a mobile station utilizing a halfrate speech coder uses a bitrate of only 6.5 kbit/s. The result will be that only every second timeslot of a fullrate channel is necessary for a call using halfrate speech coding. Therefore, two mobile stations utilizing halfrate speech coding will be able to use the same fullrate channel for a call, which effectively doubles the capacity of each channel.

In certain cellular radio systems there may also be a mixture of mobile stations with and without antenna diversity. In such cases there might be a difference in quality requirements in order for a channel to support a mobile with antenna diversity compared to a mobile without antenna diversity. One way to achieve diversity is to use two different reception channels that are independently influenced by fading. The risk of both channels being adversely affected by a deep fading dip at the same time is relatively small. This technique employs two antennas, independently receiving the same signal and therefore differently affected by fading.

The above-discussed mobile station characteristics employed in the present invention, could also include mobile bitrate capabilities, i.e., halfrate and/or fullrate speech coders. Such mobile station characteristics could additionally consist of antenna capabilities such as antenna diversity capabilities.

Referring to FIG. 4, there is shown a diagram depicting an example of a "call types tree" illustrating the way in which call type can be determined by evaluating certain discreet characteristics in terms of the value of the parameters defining those characteristics. That is, for a particular characteristic A (which might be a mobile station, subscriber or call characteristic), the parameters may illustratively include either a value $a_0$, assumed to be a default value, or a value $a_1$. Similarly, characteristic B may be defined by a parameter having a value be (a default value) or a value $b_1$. In addition, a characteristic C may be defined by means of a parameter having a value $c_0$ (default value) or a value $c_1$. In the right hand column of FIG. 4, there is illustrated a plurality of pre-defined call types which the system may conclude exist depending upon the particular characteristics of the call based upon the values associated with those characteristics. Referring to the call type tree of FIG. 4, if the values with the index value 0 are the default values and the characteristics are modified in the order C-B-A then:

(a) for a request with the characteristic values $a_0$, $b_1$, $c_1$, the call type $CT_2$ will be associated to it; and (b) a request with the characteristic values $a_1$, $b_1$, $c_1$ will be modified to $a_1$, $b_1$, $c_0$ and the call type $CT_4$ will be associated to it. As can be seen from the column listing the pre-defined call types, there need not be a call type for each and every possible combination of characteristics. If there is no call type for a particular combination, the values of individual ones of the characteristics are successively modified (in a selected order) to the default value thereof until a defined call type is determined. Referring to FIG. 4 again, in this illustration there are 5 pre-defined call types specified as $CT_0$–$CT_4$. Three additional branches upon the call type tree remain unspecified for purposes of illustration of the fact that not every value of every characteristic need to result in a specific call type, and systems will be capable of handling call type assignments to the nearest combination of characteristic values which may be determined.

Referring now to the flow chart of FIG. 5, there is illustrated a procedure by which the system selects the call type to be associated with a particular incoming call as a function of and dependent upon the characteristics of the request. The routine begins at 31 with a communication channel request and at 32 the system receives the particular characteristics associated with the request and locates the branch on a call type tree, of the type illustrated in FIG. 4, which corresponds to the request characteristics. At 33, the system first determines whether or not there are any pre-defined call types corresponding to the tree branch defined by the specific combination of characteristics received. If so, the system associates that particular call type to the request at 34 and the routine ends at 35. If, at 33, however, there are no call types corresponding to the specific characteristics defined in the request, the system moves to 36 and sets one of the characteristic values of the request to the default value thereof and then, at 37, the system locates the branch in the call type tree which corresponds to the modified request characteristics. The system then returns to 33 to determine if there are any pre-defined call types corresponding to the call tree branch comprising the modified characteristics. The routine continues to loop through a preselected sequence of modifications of the characteristics until each call is associated with a call type depending upon the nearest match with the then modified characteristics of the request.

Figure 6:
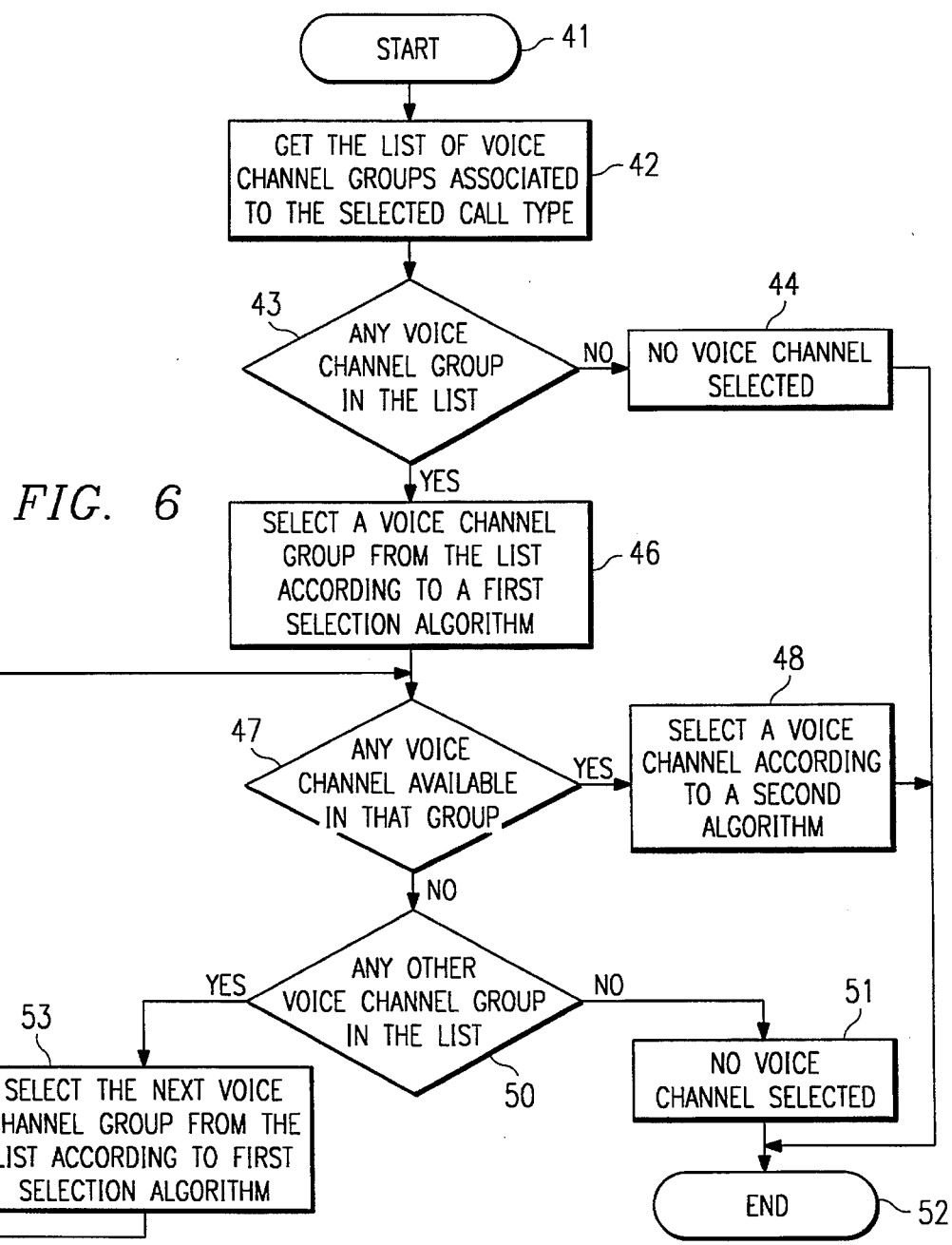
FIG. 6 is a flow chart illustrating a method of communication channel selection used in the present invention.

Referring back to FIG. 3, once a call type determination is made by the system, communication channel selection is performed in accordance with the procedures of FIG. 6.

As shown in FIG. 6, the system begins at 41 and at 42 gets the list of communication channel groups which are associated to the selected call type which has been determined for the communication channel request being processed. At 43, the system inquires as to whether or not there is any communication channel groups in that list. If not, the system moves to conclude at 44 that no communication channel may be selected and the routine ends at 45. If, however, at 43 it is determined that there are one or more communication channel groups in the list, the system moves to 46 and selects a communication channel group from the list in accordance with a first selection algorithm. Next, at 47, the system inquires as to whether or not there are any communication channels available in the selected communication channel group. If so, at 48, the system selects a communication channel according to a second selection algorithm and ends at 45. If, at 47, the system determines that there are no communication channels available in the selected group, it moves to 50 and inquires whether or not there are any other communication channel groups in the list. If not, no communication channels are selected at 51 and the procedure ends at 45. If, however, there were additional communication channel groups in the list at 50, the system moves to 53 where it selects the next communication channel group from the list according to the first selection algorithm and returns to 47 to inquire as to whether or not there are any communication channels available in that group as before.

The first algorithm defines how the list of communication channel groups associated to a call type is used in the selection process. A different algorithm can be specified on a call by call basis for each call type defined within the system. Possible implementations of the first algorithm could specify, for example, that a certain number of communication channels in certain groups are reserved for a specific call type and define the order in which the groups are scanned to locate a group with available channels. In addition, the algorithm could specify that each time a communication channel group list is scanned, certain communication channels previously designated as reserved for certain call types could be made available for other call types and could specify the number of times a communication channel group list is to be scanned without assignment of a group before congestion is declared, etc. The second selection algorithm specifies, once a communication channel group is chosen, how an idle communication channel is selected from this group. A different algorithm can be specified on a cell by cell basis for each communication channel group defined in the system. Possible implementations of the second algorithms could be, for example, first-in-first-out (FIFO), last-in-first-out (LIFO), based on the signal quality of the communication channel, etc.

Referring next to FIG. 7, there is shown a block diagram of the overall procedure associated with communication channel selection in accordance with the techniques of the present invention. As shown, communication channel request characteristics are input at 62 into a decision point 61 along with a set of pre-defined characteristic combinations from 63. A decision as to the assignment of a particular call type based upon the characteristics of the request as compared with the pre-defined characteristic combinations is output at 64. The system then enters a second decision point 65 along with a collection of communication channels associated to call types (communication channel groups) from 66. The communication channel group(s) associated with the determined call type is output at 67 into a channel selection point 68 along with selection algorithms 69, and a particular selected communication channel is determined at 71. Thus, it can be seen that the determination of the various parameters which go into communication channel selection in a particular circumstance is highly flexible in the system of the present invention and enables the operator to custom configure the system in accordance with that which is desired. For example, the particular communication channel request characteristics to which the system is responsive may be selected along with the pre-defined characteristic combinations specifying individual call types. In addition, the collection of communication channel groups which are associated with individual call types may be flexibly defined. Finally, the selection algorithms which are employed both for the selection of a communication channel group and for the selection of a particular channel from within a group may be defined dependent upon the individual characteristics and preferences of the operator.

Each operator may make the appropriate selections and provide the appropriate definitions to define the individual characteristics employed in the implementation of the system of the present invention. There is illustrated at FIG. 8 the sequence of steps through which an operator may proceed in order to make the appropriate selections in accordance with the present invention. Starting at 81, the operator first defines the new call types at 82 which are to be recognized by the system. At 83, the system inquires whether or not there are new communication channel groups to be required and, if so, moves to 84 where it defines the new communication channel groups. Next, the system assigns particular communication channels to the new communication channel groups at 85. At 86, the system associates the communication channel groups to the new call types at 86. If, however, no new communication channel groups were required at 83, the system moves directly at 86 to associate the communication channel groups to any new call types defined at 82. At 87, the system specifies the communication channel and communication channel group selection algorithms to be used in the system and at 88 reserves communication channels for the new call types. The routine ends at 89.

As can be seen, the operator of the system has the possibility of reserving a number of communication channels within a communication channel group for specific purposes. A number of remaining idle communication channels in a given communication channel group can be reserved for a number of call types on a cell by cell basis. When the number of idle communication channels in the group is equal to or less than the number of reserved communication channels, only requests leading to a specified group of call types can access these remaining communication channels. This enables the implementation of communication channel request characteristics which include certain custom call configurations such as priority service and other class of service features provided within the system.

As can be seen from the above description, the present invention enables communication channel requests to be handled by a cellular system in a logical and orderly manner to optimize the channel utilization and subscriber services offered within the system. It enables optimized use of valuable system resources, such as higher quality communication channels, and at the same time enables the system operation to be highly responsive to communication channel requests which merit such treatments.

It is believed that the operation and construction of the present invention will be apparent from the foregoing description. While the method and apparatus shown and described has been characterized as being preferred, obvious changes and modifications may be made within without departing from the scope of the invention as defined in the following claims.

What is claimed is:

1. A method of selecting a communication channel for each of a plurality of mobile stations requesting a communication channel within a cellular telecommunications system in which communication channel request characteristics are defined by values, at least one of said characteristics being assigned a default value, said method comprising the steps of:

pre-defining combinations of said characteristics, each combination comprising mobile station type characteristics, mobile subscriber type characteristics and communication channel type characteristics;

associating each of said pre-defined characteristic combinations with at least one group of communication channels available within said system;

receiving at said system a communication channel request having a plurality of characteristics;

comparing the characteristics of the received communication channel request to the pre-defined characteristic combinations;

sequentially modifying the characteristics of said received communication channel request by resetting one of the corresponding defining values to the assigned default value in response to a failure to obtain an exact match during said comparison;

successively recomparing said modified characteristics of the received communication channel request, using each of said successively reset values, to the pre-defined characteristic combinations;

assigning to the received communication channel request the pre-defined characteristic combination which first matches the modified and successively recompared characteristics of the received request; and selecting a communication channel from the at least one group of communication channels associated with said first pre-defined characteristic combination.

2. The method of claim 1 in which said mobile station type characteristics comprise the frequency, modulation or coding capabilities of each mobile station, said mobile subscriber type characteristics comprise classes of service for each mobile subscriber and said communication channel type characteristics comprise call types.

3. The method of claim 2 wherein said classes of service comprise at least one of basic telephone service, conference calling, data service, call forwarding, call waiting, call privacy, message privacy and voice mail.

4. The method of claim 2 wherein said frequency capabilities include at least one of basic frequency band operation and extended frequency band operation; said modulation capabilities include at least one of analog modulation and digital modulation; and said coding capabilities include at least one of full-rate coding and half-rate coding.

5. The method of claim 2 wherein said call types include at least one of call origination, call termination, intercell handoff and intracell handoff.

6. A system for selecting a communication channel for each of a plurality of mobile stations requesting a communication channel within a cellular telecommunications system in which communication channel request characteristics are defined by corresponding values, at least one of said characteristics being assigned a default value, said system comprising:

means for pre-defining combinations of said characteristics, each combination comprising mobile station type characteristics, mobile subscriber type characteristics and call type characteristics;

means for associating each of said pre-defined characteristic combinations with at least one group of communication channels available within said system;

means for receiving at said system a communication channel request having a plurality of characteristics;

means for comparing the characteristics of the received communication channel request to the pre-defined characteristic combinations;

means for sequentially modifying the characteristics of said received communication channel request by resetting one of the corresponding defining values to the assigned default value in response to a failure to obtain an exact match during a comparison of said comparing means;

means for successively recomparing said modified characteristics of the received communication channel request, using each of said successively reset values, to the pre-defined characteristic combinations;

means for assigning to the received communication channel request the pre-defined characteristic combination which first matches the modified and successively recompared characteristics of the received request; and means for selecting a communication channel from the at least one group of communication channels associated with said first pre-defined characteristic combination.

7. The system of claim 6 in which said mobile station type characteristics comprise the frequency, modulation or coding capabilities of each mobile station, said mobile subscriber type characteristics comprise the classes of service for each mobile subscriber and said communication channel type characteristics comprise call types.

8. The system of claim 7 wherein said classes of service comprise at least one of basic telephone service, conference calling, data service, call forwarding, call waiting, call privacy, message privacy and voice mail.

9. The system of claim 7 wherein said frequency capabilities include at least one of basic frequency band operation and extended frequency band operation; said modulation capabilities include at least one of analog modulation and digital modulation; and said coding capabilities include at least one of full-rate coding and half-rate coding.

10. The system of claim 7 wherein said call types include at least one of call origination, call termination, intercell handoff and intracell handoff.

11. In a radio telecommunications system which uses a plurality of communication channels and which provides a plurality of services to a plurality of mobile subscribers in said system, each of said mobile subscribers using a mobile station to communicate signals with said system over one of said channels and being provided with at least one of said services by said system, said mobile station having at least one of a plurality of station characteristics, said signals being communicated under different call characteristics, a method of assigning one of said channels to said mobile station comprising the steps of:

dividing said channels into a plurality of groups each of which is associated with at least one of each of said services, said station characteristics and said call characteristics;

receiving at said system a request for a communication channel for one of said mobile stations being used by one of said mobile subscribers to communicate with said system under one of said call characteristics; and assigning in response to said request a communication channel from the selected one of said groups which is associated with a selectively weighted greater combination of the services being provided to said one subscriber, station characteristics of said one mobile station, and call characteristics under which said one mobile station is communicating with said system.

12. The method of claim 11 wherein said plurality of services comprise at least one of basic telephone service, conference calling, data service, call forwarding, call waiting, call privacy, message privacy and voice mail.

13. The method of claim 11 wherein said station characteristics comprise at least one of analog modulation, digital modulation, basic frequency band, extended frequency band, half-rate coding, full-rate coding, and antenna diversity.

14. The method of claim 11 wherein said call characteristics comprise call origination, call termination, intercell handoff and intracell handoff.

15. A method of assigning communication channels in a mobile radio telecommunication system comprising the steps of:

selectively defining a plurality of characteristics for communication channel requests within said system, said characteristics comprising mobile station, subscriber and call characteristics;

selectively defining a plurality of types of possible communication channel requests;

assigning to each type of possible communication channel request a combination of one or more of each of said characteristics;

assigning to each combination of characteristics comprising a type of possible communication channel request at least one group of communication channels within said system;

receiving a communications channel request at said system which includes a plurality of request characteristics;

determining for the received request the type of possible communication channel request it most nearly approximates based upon its characteristics;

selecting the communication channel group(s) assigned to the most nearly approximate type of said received request; and assigning to said received request a communication channel from said selected group(s).

16. The method of claim 15 in which said mobile station characteristics comprise at least one of analog modulation, digital modulation, basic frequency band, extended frequency band, half-rate coding, full-rate coding, and antenna diversity.

17. The method of claim 15 in which said subscriber characteristics comprise at least one of basic telephone service, conference calling, data service, call forwarding, call waiting, call privacy, message privacy and voice mail.

18. The method of claim 15 in which said call characteristics comprise at least one of call origination, call termination, intercell handoff and intracell handoff.

19. A method for assigning communication channels for calls associated with a plurality of telephone stations being used by a plurality of subscribers, said calls having different characteristics, said telephone stations having different communication capabilities and said subscribers having different classes of service, said method comprising the steps of:

pre-defining a plurality of call types with each call type corresponding to at least one of said call characteristics, at least one of said communication capabilities and at least one of said classes of service;

assigning at least one group of communication channels for each of said call types;

detecting a call request associated with one of said telephone stations being used by one of said subscribers;

determining a call type of said detected call request by analyzing the characteristic of said detected call request, the communication capability of said one telephone station and the class of service of said one subscriber;

matching the call type of said detected call request to the nearest one of said predefined call types; and selecting a communication channel for said detected call request from the group(s) of communication channels preassigned to the predefined call type most nearly matching the call type of said detected call request.

20. The method of claim 19 wherein said telephone stations comprise mobile stations used by mobile subscribers in a cellular radio communications system.

21. The method of claim 20 wherein said communication capability of said one telephone station includes at least one of analog modulation, digital modulation, basic frequency operation, extended frequency operation, mobile transmit power, portable transmit power, transportable transmit power, half-rate coding, full-rate coding and antenna diversity.

22. The method of claim 20 wherein said class of service of said one mobile subscriber includes at least one of priority service, data service, call forwarding, call transfer, call waiting, message waiting, voice privacy, message privacy and voice mail.

23. The method of claim 20 wherein said characteristic of said detected call request comprises originating call, terminating call or handoff call.

24. A system for assigning communication channels for calls associated with a plurality of telephone stations being used by a plurality of subscribers, said calls having different characteristics, said telephone stations having different communication capabilities and said subscribers having different classes of service, said system comprising:

means for pre-defining a plurality of call types with each call type corresponding to at least one of said call characteristics, at least one of said communication capabilities and at least one of said classes of service;

means for assigning at least one group of communication channels for each of said call types;

means for detecting a call request associated with one of said telephone stations being used by one of said subscribers;

means for determining a call type of said detected call request, by analyzing the characteristic of said detected call request, the communication capability of said one telephone station and the class of service of said one subscriber;

means for matching the call type of said detected call request to the nearest one of said predefined call types; and means for selecting a communication channel for said detected call request from the group(s) of communication channels preassigned to the predefined call type most nearly matching the call type of said detected call request.

25. The system of claim 24 wherein said telephone stations comprise mobile stations used by mobile subscribers in a cellular radio communications system.

26. The system of claim 25 wherein said communication capability of said one telephone station includes at least one of analog modulation, digital modulation, basic frequency operation, extended frequency operation, mobile transmit power, portable transmit power, transportable transmit power, half-rate coding, full-rate coding and antenna diversity.

27. The system of claim 25 wherein said class of service of said one mobile subscriber includes at least one of priority service, data service, call forwarding, call transfer, call waiting, message waiting, voice privacy, message privacy and voice mail.

28. The system of claim 25 wherein said characteristic of said detected call request comprises originating call, terminating call or handoff call.

* * * * *

UNITED STATES PATENT AND TRADEMARK OFFICE
CERTIFICATE OF CORRECTION

PATENT NO. : 5,504,939
DATED : Apr. 2, 1996
INVENTOR(S) : Mayrand et al.

It is certified that error appears in the above-indentified patent and that said Letters Patent is hereby corrected as shown below:

Column 1, lines 16-17    Replace "as signed"
With --assigned--

Column 1, line 27    Replace "congested this"
With --congested. This--

Column 2, lines 6-7    Replace "frequencys"
With --frequency--

Column 4, line 21    Replace "subscriber"
With --subscribers--

Column 5, line 25    Replace "capabilites"
With --capabilities--

Column 7, line 47    Replace "be"
With --$b_0$-

Signed and Sealed this

Twenty-third Day of December, 1997

Attest:

BRUCE LEHMAN

*Attesting Officer*    *Commissioner of Patents and Trademarks*